Patented Feb. 21, 1939

2,148,252

UNITED STATES PATENT OFFICE 2,148,252

INTERMEDIATE FOR AZO DYES AND THE MANUFACTURE THEREOF

Frithjof Zwilgmeyer, Arden, Del., assignor to E. I. du Pont de Nemours & Company, Wilmington, Del., a corporation of Delaware No Drawing. Application December 1, 1937, Serial No. 177,484

15 Claims. (Cl. 260—164)

This invention relates to azo compounds, and especially to new compounds which are useful as coupling components for the preparation of ice colors and to processes of making the new compounds.

It is among the objects of the invention to provide new coupling components which can be coupled on the fibre to suitable diazotized aryl amines by the usual ice color methods to produce fast dyeings. Another object of the invention is to provide processes for preparing the new coupling components which are represented by the general formula

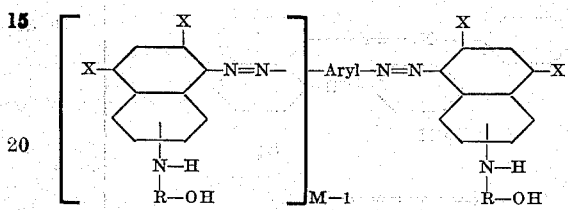

in which Aryl is an aromatic radical from the group consisting of benzene, naphthalene, anthraquinone, azo-benzene, diphenylamine, diphenyl-ether and carbazole compounds, one X is hydrogen and the other X is hydroxy, R is the residue of a dihydroxy benzene compound which is devoid of carboxy and sulfonic acid groups and M is an integer 1 or 2 depending upon whether aryl is the residue of a mono-amine or a diamine compound. Aryl may be substituted once or more than once by any radical which does not impart solubility to the products, such as alkyl, alkoxy, halogen, nitro, acylamino and trifluoromethyl groups, but not by carboxy and sulfonic acid. Other objects of the invention will be apparent from the following description.

The objects of the invention are attained generally by diazotizing a primary aryl amine which is devoid of carboxy or sulfonic acid groups and coupling in alkaline medium to an amino naphthol having the general formula

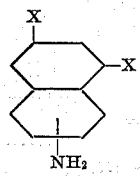

in which one X is hydroxy and the other X is hydrogen, thereby producing a compound represented by the formula

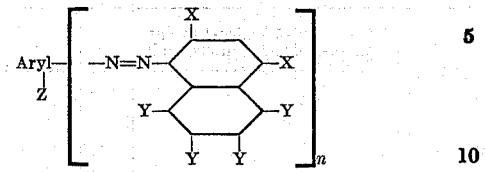

in which Aryl is an aromatic nucleus of the benzene, naphthalene, anthraquinone, azo-benzene, carbazole, diphenyl and diphenyl-ether series, which is free from carboxy and sulfonic acid groups, one X is hydroxy and the other X is hydrogen, one Y is amino and the other Y's are hydrogen, $n$ is one of the integers 1 or 2 depending upon whether aryl is the residue of a monoamine or a diamine compound, and Z is at least one of the group consisting of hydrogen, alkyl, alkoxy, halogen, nitro, acylamino and trifluoromethyl. The product of coupling is then condensed by methods well known to the art with at least one equivalent of a dihydroxy benzene compound which is devoid of carboxy and sulfonic acid groups, such as resorcinol, and the product of condensation is finally separated from the reaction mixture.

The invention will be more fully understood by reference to the following examples by means of which the invention is illustrated but the invention is not limited thereto.

Example I 100 parts of resorcinol and 20 parts of fused zinc chloride at 180° C. were mixed. 20 parts of 8 - (2':5' - dichlor - benzene - azo) - 1 - amino - 7-hydroxy-naphthalene were added to the mixture. The temperature was raised to 185°–190° C. and held at this temperature one hour during which time the condensation had taken place and the mass was then added to one liter of cold water while stirring. The precipitated product was filtered off and washed with 500 parts of water. The filter cake was dissolved in 1000 cc. of water containing sufficient sodium hydroxide to show a definite test for alkalinity on Clayton Yellow paper and was filtered from any insoluble matter. The filtrate, after being cooled to 0–10° C. was acidified with 10% hydrochloric acid. The precipitate which was formed was filtered out, washed, and dried at 55° C. in an air drier.

21 parts of a dark, brown product represented by the following formula were obtained.

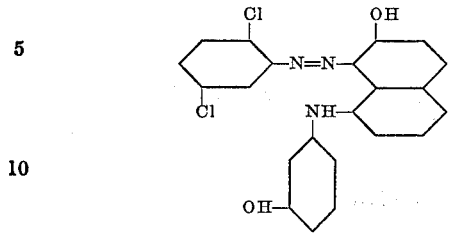

The compound is practically insoluble in water and is soluble in solutions of alkali metal hydroxides.

Cotton piece goods was printed with a printing paste containing molecular proportions of this compound and the diazoimino compound obtained by reacting diazotized 4-chloro-2-amino-toluene and methyl glucamine. The prints were dried and developed in steam which contained vapors of acetic acid. The printed pattern was a fast deep brown dyeing which had excellent fastness to washing.

The 8-(2':5'-dichlor-benzene-azo)-1-amino-7-hydroxy-naphthalene used in this example may be obtained by coupling molecular proportions of diazotized 2:5-dichlor-aniline to 1-amino-7-hydroxy-naphthalene in aqueous alkaline medium and separating the product from the coupling medium by methods well known to the art.

In the following examples the compounds indicated were condensed by the method described in Example I giving approximately similar yields. The dyeings were in general browns having good fastness properties and they are useful in the manners hereinbefore described.

| Example No. | Amino base | Parts | Condensed with— | Parts | Formula of product | Yield parts |
|---|---|---|---|---|---|---|
| 2 | 8-(2'-methyl-5'-chlor-benzene-azo)-1-amino-7-hydroxy-naphthalene | 20 | Resorcinol | 100 | | 19 |
| 3 | 8-(2'-nitro-4'-chlor-benzene-azo)-1-amino-7-hydroxy-naphthalene | 20 | do | 100 | | 19 |
| 4 | 8-(1'-anthraquinone-azo)-1-amino-7-hydroxy-naphthalene | 20 | do | 100 | | 20 |
| 5 | 8-(2'-anthraquinone-azo)-1-amino-7-hydroxy-naphthalene | 20 | do | 100 | | 20 |
| 6 | Tolidine-tetrazo-8-(1'-amino-7'-hydroxy-naphthalene) | 20 | do | 100 | | 23 |
| 7 | Tolidine-sulfone-tetrazo-8-(1'-amino-7'-hydroxy-naphthalene) | 20 | do | 100 | | 22 |
| 8 | 8-(3'-azo-carbazole)-1-amino-7-hydroxy-naphthalene | 20 | do | 100 | | 20 |

| Example No. | Amino base | Parts | Condensed with— | Parts | Formula of product | Yield parts |
|---|---|---|---|---|---|---|
| 9 | 8-(azo-benzene-4'-azo-4''-dimethyl-amino-benzene)-1-amino-7-hydroxy-naphthalene | 20 | Resorcinal | 100 | [structure] | 19 |
| 10 | 8-(2'-methoxy-5'-chlorbenzene-azo)-1-amino-5-hydroxy-naphthalene | 20 | ...do... | 100 | [structure] | 20 |
| 11 | 8-(2':5'-dichlor-benzene-azo)-1-amino-5-hydroxy-naphthalene | 20 | ...do... | 100 | [structure] | 21 |
| 12 | 8-(2':5'-dichlor-benzene-azo)-2-amino-7-hydroxy-naphthalene | 20 | ...do... | 100 | [structure] | 20 |
| 13 | 4-(2'-methoxy-5'-chlor-benzene-azo)-1-amino-5-hydroxy-naphthalene | 20 | Pyrocatech | 100 | [structure] | 19 |

The compounds of the invention can be coupled to any diazotized aryl amine compound which can be used to prepare ice colors. Among the large number of such compounds the following are mentioned as representative:

Aniline
Meta-chlor-aniline
p-Nitro-aniline
4-nitro-2-amino-anisole
4-chloro-2-amino-anisole
5-chloro-2-amino-toluene
3-amino-benzo-trifluoride
Ortho-phenetidine
4-benzoyl-amino-2:5-diethoxy-aniline
Alpha-naphthylamine
1-amino-2-methoxy-naphthalene
Amino-azo-benzene
Benzidine
4:4'-diamino-diphenylamine
4:4'-diamino-diphenyl-ether
4:4'-diamino-azo-benzene
3-nitro-4-amino-toluene
2:5-dichloro-aniline
Ortho-chloro-aniline
4-chloro-2-nitro-aniline
N-(para-amino-benzoyl)-aniline
Ortho-phenetidine-azo-alpha-naphthyl-amine
Para-anisidine-azo-2:5-dimethoxy-aniline
Alpha-amino-anthraquinone
3-amino-carbazole
Dianisidine
Para-amino-diphenyl Good dyeings were also made by using printing pastes in which the ice color bases were converted to nitrosamines instead of diazoimino compounds.

Instead of applying the coupling component in the form of a printing paste in conjunction with a diazoimino compound or a nitrosamine, the goods may be padded with alkaline solutions of the coupling components and the dyes developed by applying solutions of the diazotized aryl amines. The compounds will also couple with diazotized ice color bases in acid media and form colored insoluble compounds. Likewise the compounds couple with any diazotized azo dye base and form colored products.

Any dihydroxy benzene such as an ortho- or para-dihydroxy benzene can be used instead of resorcinol to form the end component and either a 2- or a 4-hydroxy-naphthylamine may be used to give the naphthalene component. The starting compound for the first or diazo component must have a diazotizable amino group. This amino substituted compound may have an aryl, diaryl or aryl-azo nucleus having one or more diazotizable amino groups as illustrated in the examples, provided they are free from solubilizing groups. When the compound has more than one diazotized amino group, more than one equivalent of a 2- or 4-hydroxy-naphthylamine may be coupled, or all but one coupled group may be displaced by another azo dye coupling component which is free from solubilizing groups. When more than one equivalent of a 2- or a 4-hydroxynaphthylamine is coupled to the base, one or more than one of the amino groups of the hydroxy naphthylamine can be condensed with the dihydroxy benzene compound.

Aryl as shown in the general formula represents an aromatic nucleus of a benzene, naphthalene, anthracene, azo-benzene, diphenyl, diphenyl-ether or carbazole compound which may be substituted once or more than once by alkyl straight or branched chain groups, such as methyl, ethyl, propyl, butyl, stearyl, lauryl and even longer chain groups, the corresponding alkoxy groups, halogen, nitro, acylamino, and trifluoro-methyl.

For the condensation any non-reactive dehydrating agent which can be heated to condensation temperatures can be used, such as boric acid and many others known to the art for this type of condensation.

The described methods of diazotization, coupling and condensation can be variously modified as will be understood by those skilled in the art and the condensation products may be further purified by repeating the described method of purification or by other methods, such as crystallization from a suitable organic solvent.

The products of the invention are especially useful in the preparation of ice colors, but they may be used to produce azo colors in substance.

As numerous variations besides those which have been specifically mentioned can be made without departing from the spirit and scope of the invention as will be understood by those skilled in the art, it is to be understood that no limitations are intended in the annexed claims except those which are specifically recited or are imposed by the prior art.

I claim:

1. A compound represented by the formula

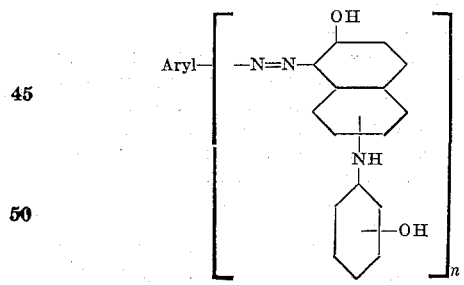

in which Aryl is the residue of a primary aryl amine from the group consisting of benzene, naphthalene, anthraquinone, azo-benzene, diphenyl, diphenyl-ether and carbazole compounds which are devoid of carboxy and sulfonic acid groups, and $n$ is an integer not greater than 2.

2. A compound represented by the formula

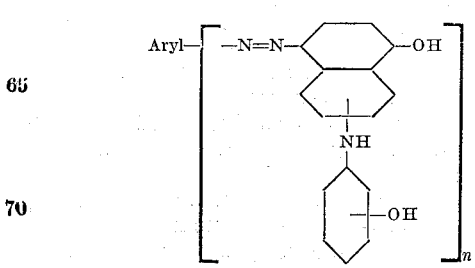

in which Aryl is the residue of a primary aryl amine from the group consisting of benzene, naphthalene, anthraquinone, azo-benzene, diphenyl, diphenyl-ether and carbazole compounds which are devoid of carboxy and sulfonic acid groups, and $n$ is an integer not greater than 2.

3. A compound represented by the formula

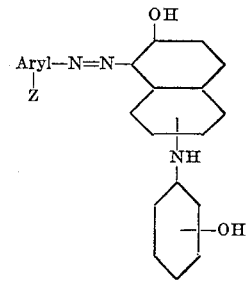

in which Aryl is a benzene radical and Z is at least one of the group consisting of hydrogen, alkyl, alkoxy, halogen, nitro, acylamino, and trifluoro-methyl.

4. A compound represented by the formula

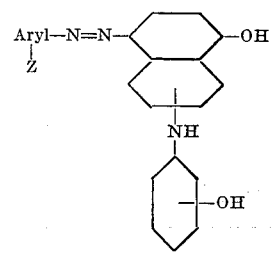

in which Aryl is a benzene radical and Z is at least one of the group consisting of hydrogen, alkyl, alkoxy, halogen, nitro, acylamino, and trifluoro-methyl.

5. A compound represented by the formula

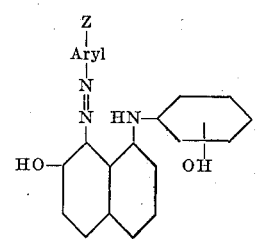

in which Aryl is a naphthalene radical and Z is at least one of the group consisting of hydrogen, alkyl, alkoxy, halogen, nitro, acylamino and trifluoro-methyl.

6. The compound represented by the formula

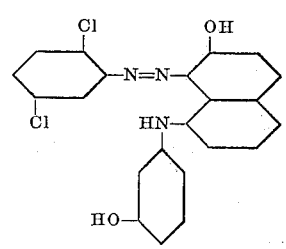

7. The compound represented by the formula

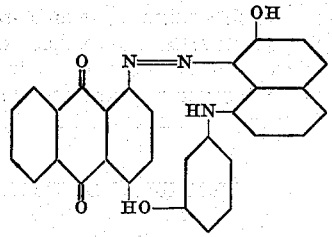

8. The compound represented by the formula

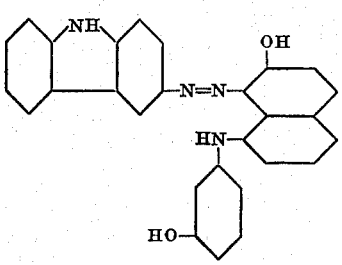

9. The process which comprises heating at least one equivalent of a dihydroxy benzene compound which is devoid of carboxy and sulfonic acid groups in a non-reactive dehydration condensing medium and at condensation temperatures with a compound represented by the formula

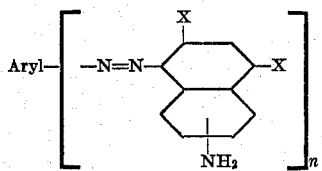

in which Aryl is the residue of a primary aryl amine from the group consisting of benzene, naphthalene, anthraquinone azo-benzene, diphenyl, diphenyl-ether and carbazole compounds which are devoid of carboxy and sulfonic acid groups, one X is hydrogen and the other X is hydroxy, and $n$ is an integer not greater than 2.

10. The process which comprises heating at least one equivalent of a dihydroxy benzene compound which is devoid of carboxy and sulfonic acid groups in a non-reactive dehydration condensing medium and at condensation temperatures with a compound represented by the formula

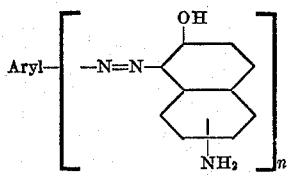

in which Aryl is the residue of a primary aryl amine from the group consisting of benzene, naphthalene, anthraquinone, azo-benzene, diphenyl, diphenyl-ether and carbazole compounds which are devoid of carboxy and sulfonic acid groups, and $n$ is an integer not greater than 2.

11. The process which comprises heating at least one equivalent of a dihydroxy benzene compound which is devoid of carboxy and sulfonic acid groups in a non-reactive dehydration condensing medium and at condensation temperatures with a compound represented by the formula

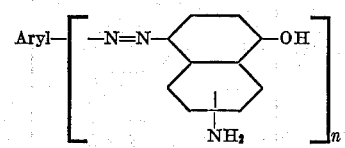

in which Aryl is the residue of a primary aryl amine from the group consisting of benzene, naphthalene, anthraquinone, azo-benzene, diphenyl, diphenyl-ether and carbazole compounds which are devoid of carboxy and sulfonic acid groups, and $n$ is an integer not greater than 2.

12. The process which comprises coupling in alkaline medium a compound represented by the formula

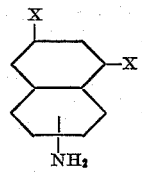

in which one X is hydrogen and the other X is hydroxy to a diazotized aromatic amino-substituted compound represented by the formula

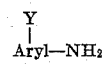

in which Aryl is the radical of one of the group consisting of benzene, naphthalene, anthracene, azo-benzene, diphenyl, diphenyl-ether and carbazole, and Y is at least one of the group consisting of alkyl, alkoxy, halogen, nitro, acylamino and trifluoro-methyl; and then heating the product of coupling in a non-reactive dehydrating bath at condensation temperatures and in the presence of a dihydroxy benzene until condensation has taken place.

13. The process which comprises heating a dihydroxy benzene and one of the compounds of the group represented by the formula

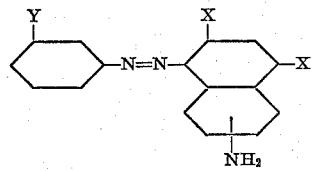

in which one X is hydrogen and the other X is hydroxy and Y is at least one of the group consisting of alkyl, alkoxy, halogen, nitro, acylamino, and trifluoro-methyl, in a non-reactive dehydrating medium at condensation temperatures until condensation has taken place, and then separating the product of condensation from said medium.

14. The process which comprises heating a dihydroxy benzene and 8-(2':5'-dichlor-benzene-azo)-1-amino-7-hydroxy-naphthalene in molar proportions in fused zinc chloride at temperatures of 185° to 190° C. until there is formed a product of condensation which is represented by the formula

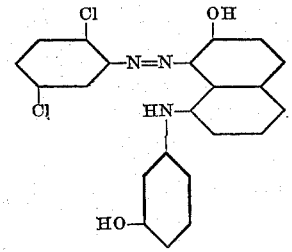

15. A compound represented by the formula

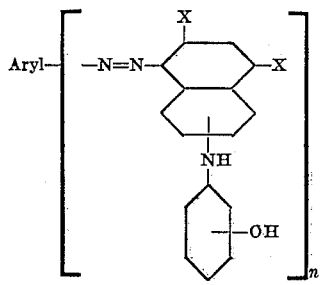

in which Aryl is the residue of a primary aryl amine from the group consisting of benzene, naphthalene, anthraquinone, azo-benzene, diphenyl, diphenyl-ether and carbazole compounds which are devoid of carboxy and sulfonic acid groups, $n$ is an integer not greater than 2, one X is hydroxy and the other X is hydrogen.

FRITHJOF ZWILGMEYER.

Certificate of Correction

February 21, 1939.

Patent No. 2,148,252.

FRITHJOF ZWILGMEYER

It is hereby certified that errors appear in the printed specification of the above numbered patent requiring correction as follows: Page 3, line 36, in the formula, for the word "Pyrocatech" read *Pyrocatechol;* page 5, first column, lines 2 to 10 inclusive, strike out the formula and insert instead the following—

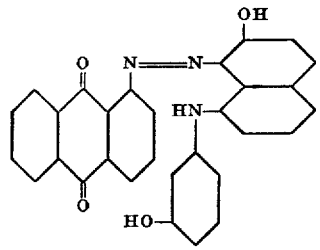

and that the said Letters Patent should be read with these corrections therein that the same may conform to the record of the case in the Patent Office.

Signed and sealed this 11th day of April, A. D. 1939.

[SEAL]

Henry Van Arsdale
*Acting Commissioner of Patents.*